(12) United States Patent
Lee et al.

(10) Patent No.: US 12,052,372 B2
(45) Date of Patent: *Jul. 30, 2024

(54) NETWORK ACCESS PRIVACY

(71) Applicant: QUALCOMM Incorporated, San Diego, CA (US)

(72) Inventors: Soo Bum Lee, San Diego, CA (US); Stefano Faccin, San Ysidro, CA (US); Anand Palanigounder, San Diego, CA (US); Miguel Griot, La Jolla, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/650,813

(22) Filed: Feb. 11, 2022

(65) Prior Publication Data

US 2022/0166628 A1 May 26, 2022

Related U.S. Application Data

(60) Continuation of application No. 16/563,275, filed on Sep. 6, 2019, now Pat. No. 11,251,968, which is a
(Continued)

(51) Int. Cl.
*H04L 9/32* (2006.01)
*H04L 9/40* (2022.01)
(Continued)

(52) U.S. Cl.
CPC .......... *H04L 9/3242* (2013.01); *H04L 63/205* (2013.01); *H04W 12/02* (2013.01);
(Continued)

(58) Field of Classification Search
CPC ..... H04L 41/0806; H04L 63/10; H04L 63/20; H04L 63/205; H04L 9/3242; H04W 12/02;
(Continued)

(56) References Cited

U.S. PATENT DOCUMENTS 7,308,260 B2 12/2007 Mandayam et al.
10,433,174 B2 10/2019 Lee et al.
(Continued)

FOREIGN PATENT DOCUMENTS

| CN | 110402588 A | 11/2019 |
| KR | 20130047489 A | 5/2013 |
| WO | 2004091177 A2 | 10/2004 |

OTHER PUBLICATIONS

"3rd Generation Partnership Project; Technical Specification Group Services and System Aspects; System Architecture for the 5G System; Stage 2 (Release 15)", 3GPP Standard ; Technical Specification; 3GPP TS 23.501, 3rd Generation Partnership Project (3GPP), Mobile Competence Centre; 650, Route Des Lucioles; F-06921 Sophia-Antipolis Cedex; France, vol. SA WG2, No. V0.3. 1, Mar. 6, 2017, XP051290363, pp. 1-97.
(Continued)

*Primary Examiner* — Quoc Thai N Vu
(74) *Attorney, Agent, or Firm* — QUALCOMM IP DEPT.; James Hunt Yancey, Jr.

(57) ABSTRACT

The present disclosure provides techniques that may be applied, for example, in a multi-slice network for maintaining privacy when attempting to access the network. An exemplary method generally includes transmitting a registration request message to a serving network to register with the serving network; receiving a first confirmation message indicating a secure connection with the serving network has been established; transmitting, after receiving the first confirmation message, a secure message to the serving network
(Continued)

comprising an indication of at least one configured network slice that the UE wants to communicate over, wherein the at least one configured network slice is associated with a privacy flag that is set; and receiving a second confirmation message from the serving network indicating that the UE is permitted to communicate over the at least one configured network slice.

20 Claims, 13 Drawing Sheets

Related U.S. Application Data division of application No. 15/913,771, filed on Mar. 6, 2018, now Pat. No. 10,433,174.

(60) Provisional application No. 62/472,954, filed on Mar. 17, 2017.

(51) Int. Cl.
| | | |
|---|---|---|
| *H04W 12/02* | (2009.01) | |
| *H04W 12/069* | (2021.01) | |
| *H04W 12/084* | (2021.01) | |

(52) U.S. Cl.
CPC ....... *H04W 12/069* (2021.01); *H04W 12/084* (2021.01); *H04L 63/10* (2013.01); *H04L 63/20* (2013.01)

(58) Field of Classification Search
CPC ... H04W 12/04; H04W 12/06; H04W 12/069; H04W 12/08; H04W 12/084; H04W 48/18; H04W 76/10; H04W 40/248
See application file for complete search history.

(56) References Cited

U.S. PATENT DOCUMENTS

| | | | |
|---|---|---|---|
| 11,251,968 | B2 | 2/2022 | Lee et al. |
| 2003/0023451 | A1 | 1/2003 | Willner et al. |
| 2003/0028408 | A1 | 2/2003 | RuDusky |
| 2010/0054472 | A1 | 3/2010 | Barany et al. |
| 2016/0285630 | A1 | 9/2016 | Abraham et al. |
| 2016/0353281 | A1* | 12/2016 | Senarath ............... H04W 12/06 |
| 2017/0237718 | A1 | 8/2017 | Chen |
| 2017/0339688 | A1* | 11/2017 | Singh ................... H04W 72/51 |
| 2018/0227873 | A1 | 8/2018 | Vrzic et al. |
| 2019/0159029 | A1* | 5/2019 | Li ......................... H04W 12/06 |
| 2019/0349803 | A1 | 11/2019 | Byun et al. |
| 2021/0368347 | A1* | 11/2021 | Wang ................... H04W 76/10 |

OTHER PUBLICATIONS

"3rd Generation Partnership Project; Technical Specification Group Services and System Aspects;General Packet Radio Service (GPRS) enhancements forEvolved Universal Terrestrial Radio Access Network(E-UTRAN) Access (Release 14)", 3GPP TS 23.401 V14.3.0 (Mar. 2017), (Year: 2017), 386 Pages.

Ericsson: "Signalling Aspects of Network Slicing", 3GPP TSG-RAN WG2 #97, R2-1701051, Athens, Greece, Feb. 13-17, 2017, 6 Pages.

Huawei., et al., "Clarifications of the Registration Procedure via Untrusted Non-3GPP Access", SA WG2 Meeting #119, S2-171139, Feb. 13-17, 2017, Dubrovnik, Croatia, pp. 1-4.

Nokia: "On Providing Accepted NSSAI to the RAN", S2-170778 (was S2-170347), SA WG2 Meeting #119, Dubrovnik, Croatia, Feb. 13-17, 2017, Feb. 6, 2017 (Feb. 6, 2017), pp. 1-7.

Nokia: "Open Questions Related to Key Issue Key Issue #7.8: Privacy Protection of Network Slice Identifier", 3GPP TSG SA WG3 (Security) Meeting #86, S3-170204, Feb. 6-10, 2017, Sophia Antipolis (France), 1 Page.

SA WG2: "LS to SA WG3 on Privacy of Registration and Slice Selection Information", SA WG2 Meeting #S2-118BIS, S2-170687, Jan. 16-20, 2017, Spokane, Washington, USA, pp. 1-2.

Huawei, et al., "Way Forward w/NSSAI", 3GPP Draft, SA WG2 Meeting #119, S2-170812, NSSAI V0.7, 3rd Generation Partnership Project (3GPP), Mobile Competence Centre; 650, Route Des Lucioles; F-06921 Sophia-Antipolis Cedex; France, vol. RAN WG2, No. Dubrovnik; Feb. 13, 2017-Feb. 17, 2017, Feb. 13, 2017, XP051216933, Retrieved from the Internet: URL:http://www.3gpp.org/ftp/Meetings_3GPP_SYNC/SA2/Docs/ [retrieved on Feb. 13, 2017], 10 pages.

International Search Report and Written Opinion—PCT/US2018/021371—ISA/EPO—Jun. 5, 2018.

"Qualcomm Incorporated, "23.501: modified registration procedure for security", SA W62 Meeting #118BIS, S2-170184, Agenda Item 6.5.2".

Taiwan Search Report—TW107107622—TIPO—Jan. 25, 2022.
Taiwan Search Report—TW107107622—TIPO—Aug. 11, 2021.

* cited by examiner

NETWORK ACCESS PRIVACY

CLAIM OF PRIORITY UNDER 35 USC § 119

This application is a continuation of U.S. Non-Provisional application Ser. No. 16/563,275, filed Sep. 6, 2019, which is a divisional application of U.S. Non-Provisional application Ser. No. 15/913,771, filed Mar. 6, 2018 and now issued as U.S. Pat. No. 10,433,174, which claims the benefit of U.S. Provisional Application No. 62/472,954, filed Mar. 17, 2017, each of which is expressly incorporated by reference herein in its entirety.

FIELD OF THE DISCLOSURE

Certain aspects of the present disclosure generally relate to wireless communications and, more particularly, to methods and apparatus for network access privacy.

DESCRIPTION OF RELATED ART

Wireless communication systems are widely deployed to provide various telecommunication services, such as: telephony, video, data, messaging, and broadcasts. Typical wireless communication systems may employ multiple-access technologies capable of supporting communication with multiple users by sharing available system resources (e.g., bandwidth and transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipments (UEs). In an LTE or LTE-A network, a set of one or more base stations may define an eNodeB (eNB). In other examples (e.g., in a next generation (NR) or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNodeB (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as to support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide a method of wireless communications by a user equipment (UE), including: transmitting a registration request message to a serving network to register with the serving network; receiving a first confirmation message indicating a secure connection with the serving network has been established; transmitting, after receiving the first confirmation message, a secure message to the serving network comprising an indication of at least one configured network slice that the UE wants to communicate over, wherein the at least one configured network slice is associated with a privacy flag that is set; and receiving a second confirmation message from the serving network indicating that the UE is permitted to communicate over the at least one configured network slice.

Certain aspects of the present disclosure provide a method of wireless communications by a user equipment (UE), including: determining the UE wants to communicate over a first configured network slice that is associated with a privacy flag that is set; generating a keyed hash value associated with the first configured network slice by scrambling an identification value associated with the first configured network slice using at least one protection key; and transmitting a registration request message to a serving network to register with the serving network, wherein the registration request message comprises at least the keyed hash value associated with the first configured network slice.

Certain aspects of the present disclosure provide a method of wireless communications in a network performed by an access and mobility management function (AMF), including: receiving a registration request message associated with a user equipment (UE), requesting that the UE be registered with the network; transmitting a first confirmation message, wherein the first confirmation message indicates that a secure connection between the UE and the network has been established; receiving a secure message from the UE comprising an indication of at least one configured network slice that the UE wants to communicate over, wherein the at least one configured network slice is associated with a privacy flag that is set; determining updated privacy flag information associated with the at least one configured network slice; and transmitting a second confirmation message to the UE indicating that the UE is permitted to communicate over the at least one configured network slice, wherein the second confirmation message includes the updated privacy flag information associated with the at least one configured network slice.

Certain aspects of the present disclosure provide a method of wireless communications in a network performed by an access node (AN), including: receiving a registration request message from a user equipment (UE) requesting the UE to be registered with the network, wherein the registration request message comprises at least a keyed hash value associated with a first configured network slice, wherein the first configured network slice is associated with a privacy flag that is set; determining an identification value associated with the first configured network slice based on the keyed hash value and a protection key associated with the network; selecting an access and mobility management function (AMF) capable of serving at least the first configured network slice based on the determined identification value associated with the first configured network slice; and forwarding the registration request message to the selected AMF.

Certain aspects of the present disclosure provide a user equipment (UE) configured for wireless communications, comprising: a memory comprising executable instructions; a processor in data communication with the memory and configured to execute the executable instructions and cause the UE to: transmit a registration request message to a serving network to register with the serving network; receive a first confirmation message indicating a secure connection with the serving network has been established; transmit, after receiving the first confirmation message, a secure message to the serving network comprising an indication of at least one configured network slice that the UE wants to communicate over, wherein the at least one configured network slice is associated with a privacy flag that is set; and receiving a second confirmation message from the serving network indicating that the UE is permitted to communicate over the at least one configured network slice.

Certain aspects of the present disclosure provide an access node configured for wireless communications in a network, including: a memory comprising executable instructions; a processor in data communication with the memory and configured to execute the executable instructions and cause the access node to: receive a registration request message associated with a user equipment (UE), requesting that the UE be registered with the network; transmit a first confirmation message, wherein the first confirmation message indicates that a secure connection between the UE and the network has been established; receive a secure message from the UE comprising an indication of at least one configured network slice that the UE wants to communicate over, wherein the at least one configured network slice is associated with a privacy flag that is set; determining updated privacy flag information associated with the at least one configured network slice; and transmitting a second confirmation message to the UE indicating that the UE is permitted to communicate over the at least one configured network slice, wherein the second confirmation message includes the updated privacy flag information associated with the at least one configured network slice.

Numerous other aspects are provided including methods, apparatus, systems, computer program products, and processing systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
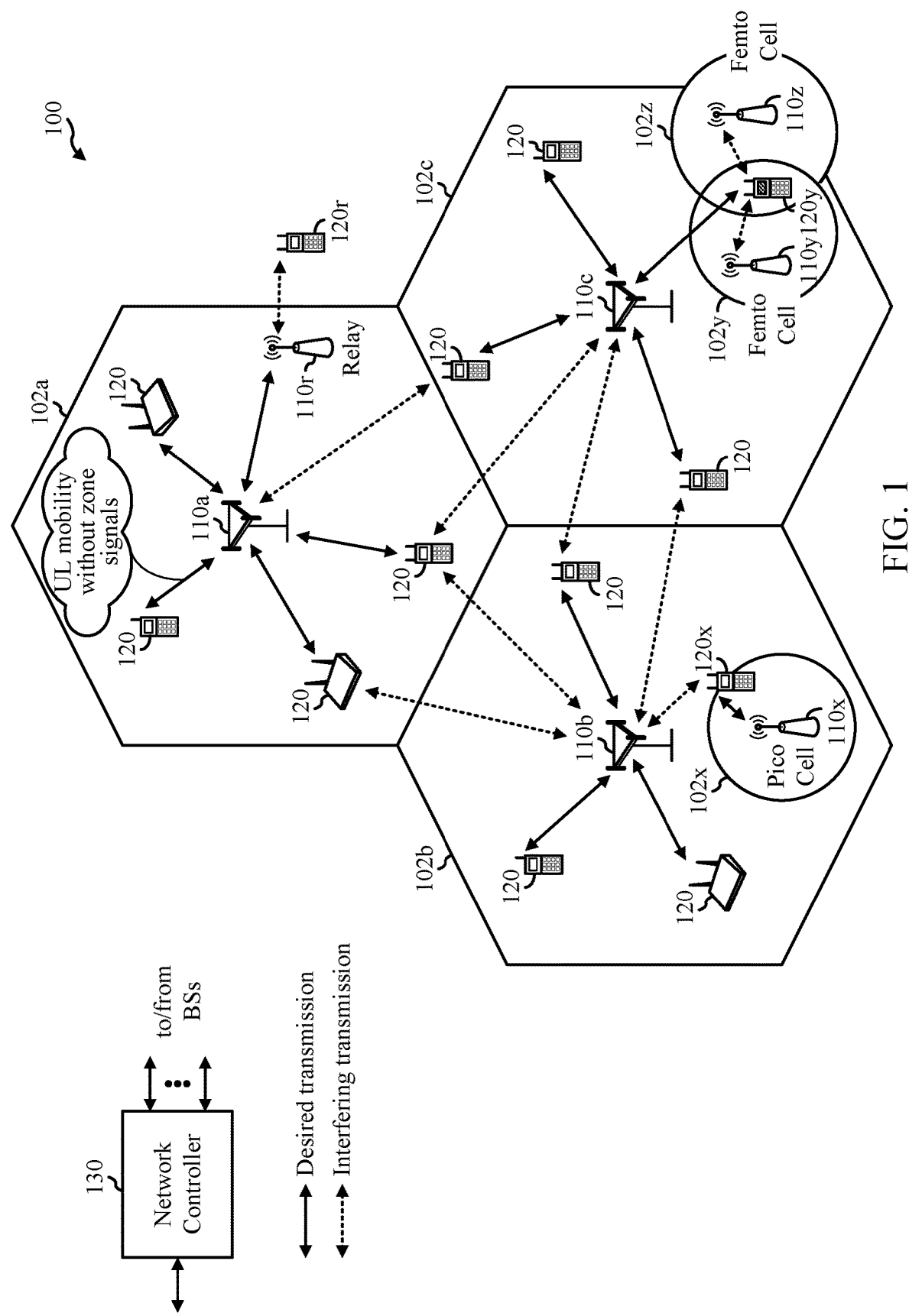
FIG. 1 is a block diagram conceptually illustrating an example telecommunications system, in accordance with certain aspects of the present disclosure.

Aspects of the present disclosure provide apparatus, methods, processing systems, and computer readable mediums for multi-slice networks, such as new radio (NR) (new radio access technology or 5G technology).

New Radio (NR) may support various wireless communication services, such as Enhanced Mobile Broadband (eMBB) targeting wide bandwidth (e.g. 80 MHz and beyond), millimeter wave (mmW) targeting high carrier frequency (e.g. 60 GHz), massive MTC (mMTC) targeting non-backward compatible MTC techniques, and/or mission critical services targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics According to certain aspects, when a user equipment (UE) wishes to access a particular slice in the 5G NR network, the UE must first register to a Public Land Mobile Network (PLMN) that provides access to the particular slice. The PLMN may be a Home PLMN (HPLMN) (e.g., a home network) with which the UE has a subscription or a visited PLMN (VPLMN) that has a roaming agreement with the HPLMN For example, the UE may transmit a registration request, including information indicating the network slices that the UE wishes to communicate over. In some cases, however, this registration procedure may lead to UE privacy leakage due to the UE providing slice information in unprotected/unencrypted signaling. For example, since the slice information is transmitted in an unencrypted registration message, an eavesdropper could intercept the message and determine certain information about the UE, such as the user identity, UE ID, and/or slices that the UE is attempting to access. This issue is particularly problematic when a UE is attempting to access sensitive network slices (e.g., public safety, government, and/or enterprise slices) as this would reveal the identity of user of the UE. Thus, aspects of the present disclosure provide techniques for maintaining privacy when attempting to access a multi-slice network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra-mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G next gen/NR network.

Example Wireless Communications System

FIG. 1 illustrates an example wireless network 100, such as a new radio (NR) or 5G network, in which aspects of the present disclosure may be performed, for example, for improving device discovery in a multi-slice network. In some cases, the network 100 may be a multi-slice network, each slice defines as a composition of adequately configured network functions, network applications, and underlying cloud infrastructures that are bundled together to meet the requirement of a specific use case or business model.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR/5G.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
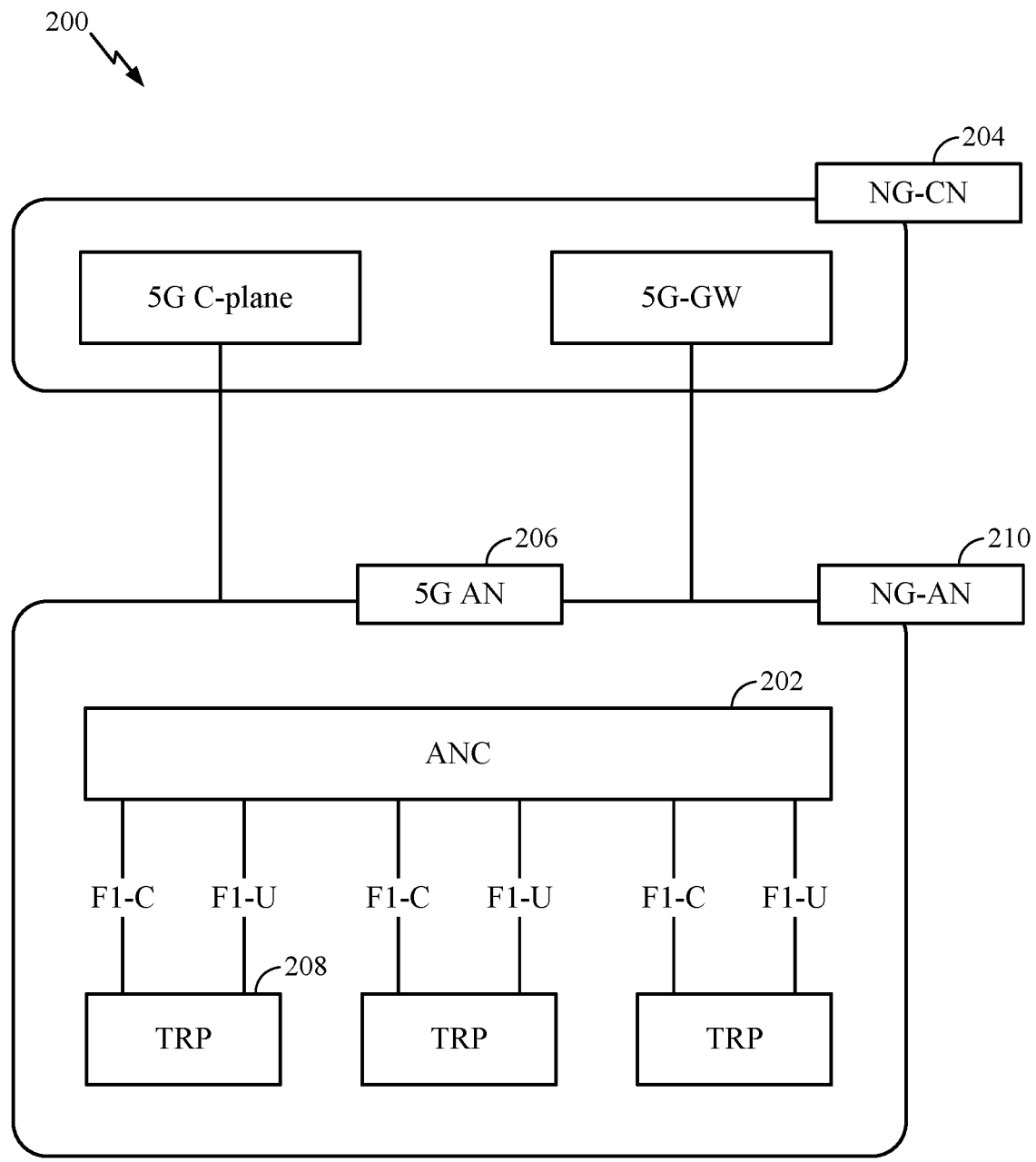
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
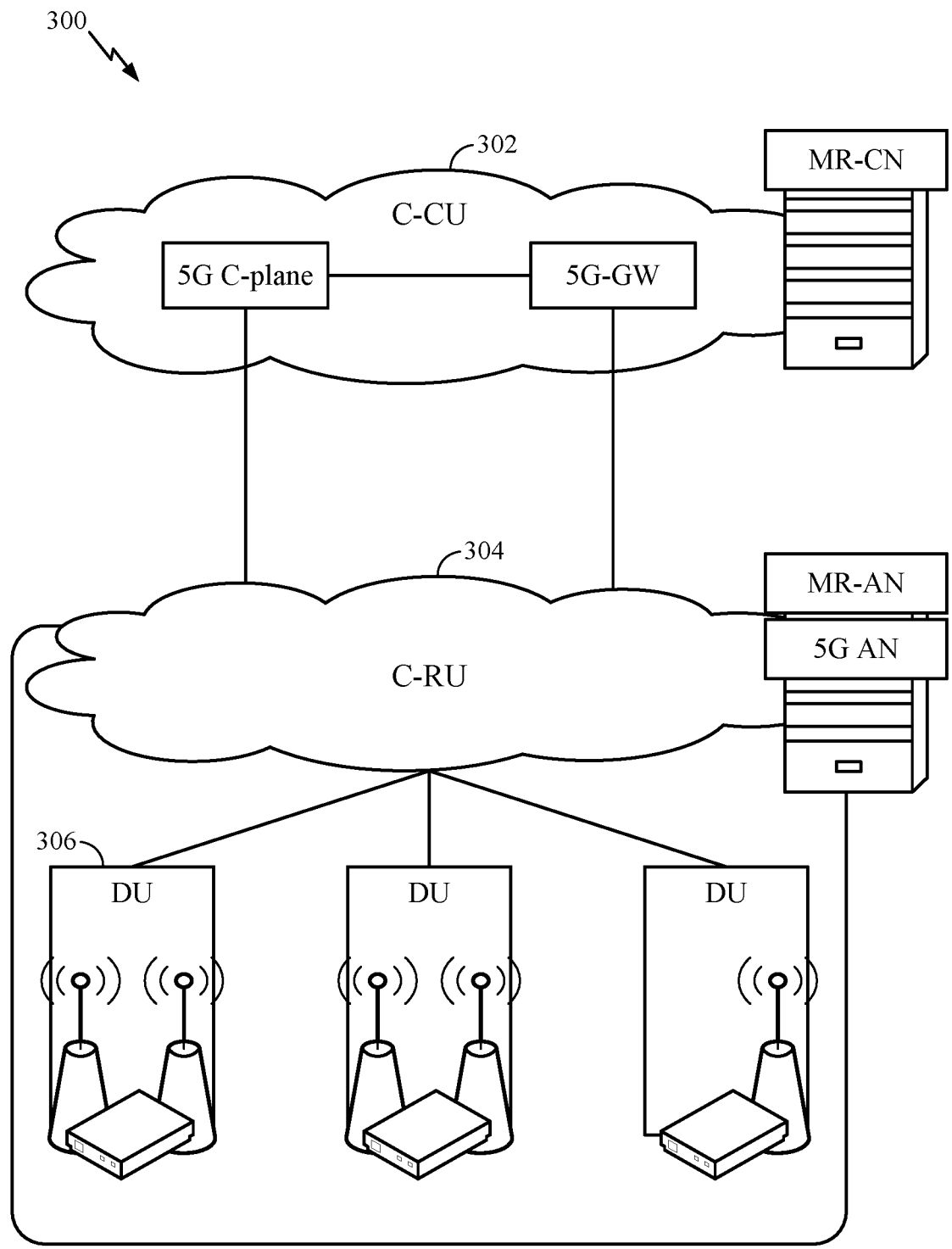
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
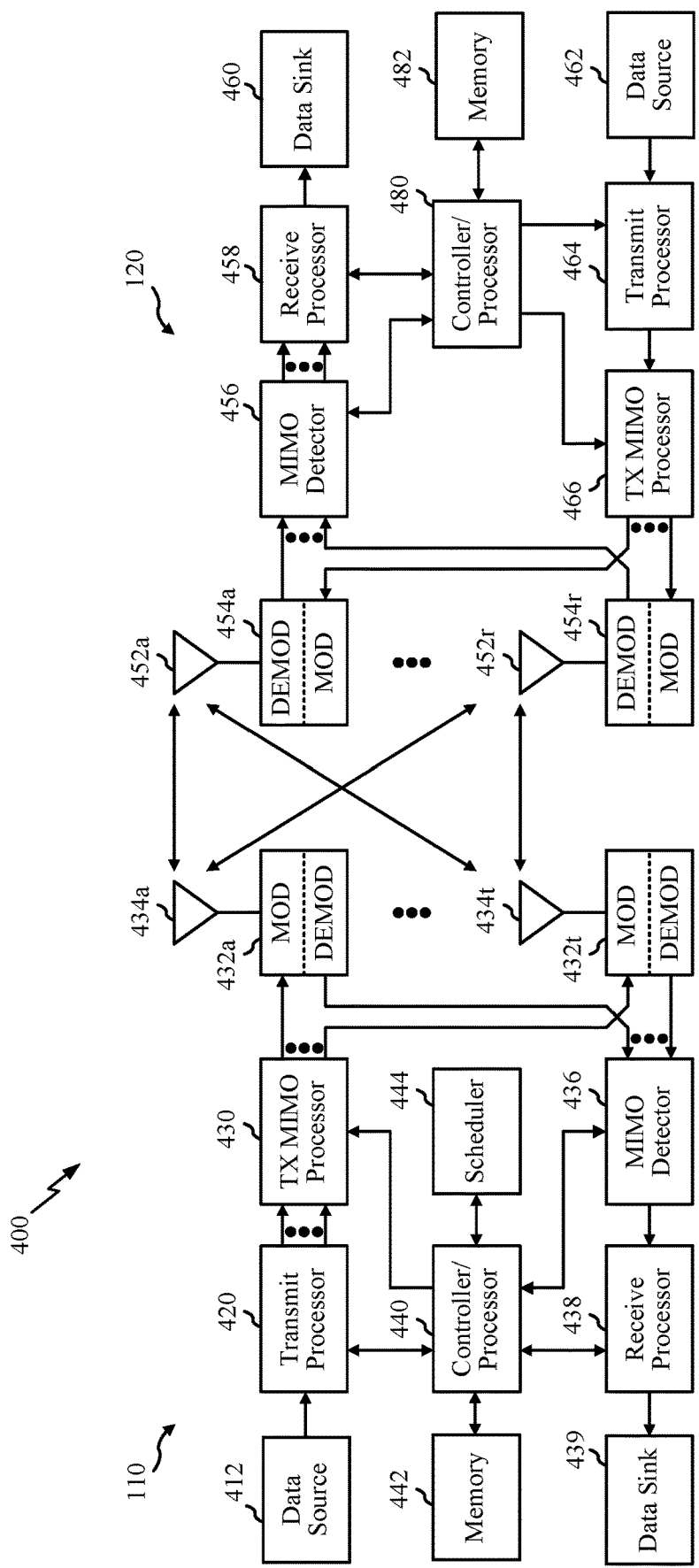
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIGS. 9-10.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r. In some embodiments, base station 110 may be an access node in a new radio (e.g., 5G) radio access network. For example, base station 110 may be a gNB or 5G NB or the like.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 8 and/or 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
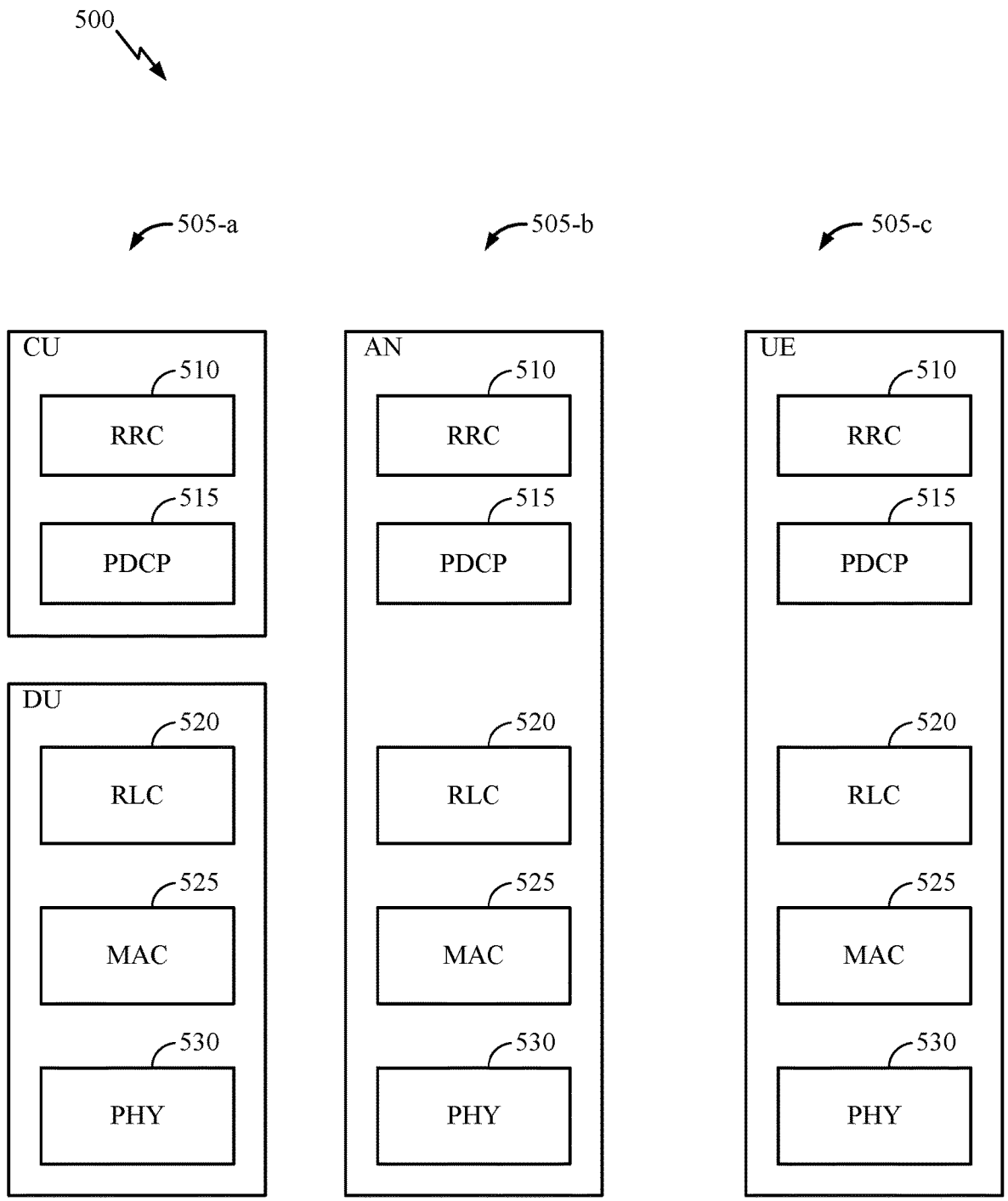
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530), such as depicted in option 505-c.

Figure 6:
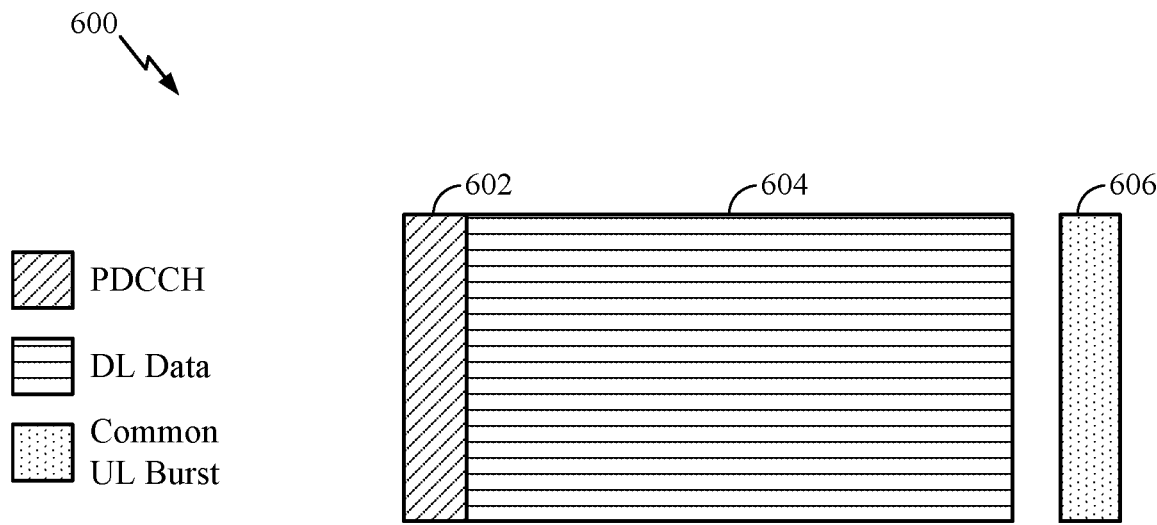
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
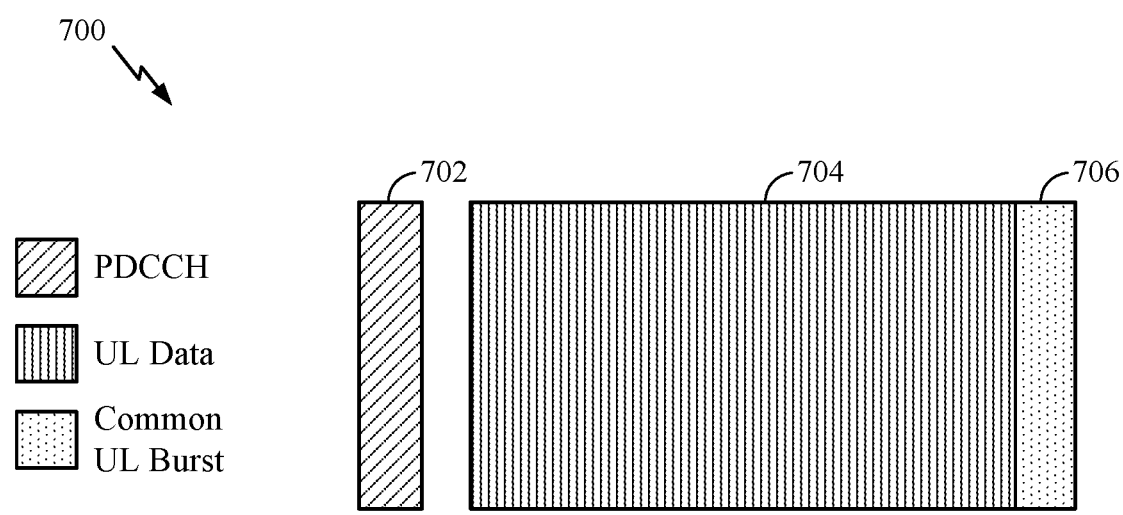
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example 5G Network Access Privacy

As noted above, a new air interface is being introduced for 5G, including features such as enhanced mobile broadband (eMBB) targeting wide bandwidth (e.g. 80 MHz and beyond), millimeter wave (mmW) targeting high carrier frequency (e.g. 60 GHz), massive MTC (mMTC) targeting non-backward compatible MTC techniques, and mission critical targeting ultra-reliable low latency communications (URLLC).

This new air interface also introduces the concept of network slicing. A network may have multiple slices, which may support different services, for example, internet of everything (IoE), URLLC, eMBB, vehicular communications (e.g., V2X such as vehicle-to-vehicle (V2V), vehicle-to-infrastructure (V2I), vehicle-to-pedestrian (V2P), vehicle-to-network (V2N)), etc. A slice may be defined as a complete logical network that comprises a set of network functions and corresponding resources necessary to provide certain network capabilities and network characteristics, which may include both 5G-AN and 5G-CN. More specifically, a slice may be the composition of adequately configured network functions, network applications, and underlying cloud infrastructures that are bundled together to meet the requirement of a specific use case or business model. In some cases, different slices may be assigned disjoint resources and may have different requirements, such as latency and/or power.

According to aspects, a network slice instance (NSI) is the instantiation of a network slice, that is, a deployed set of network functions delivering the intended network slice services according to a network slice template. A network slice comprises all of the resources required to fulfil a particular service and may include: (1) the core network control plane and user plane network functions as well as their resources (in terms of compute, storage and network resources, including the transport resources between the network functions), (2) the 5G Radio Access Network (RAN), (3) Non-3GPP Interworking Function (N3IWF) functions to the non-3GPP Access Network and their respective resources, and (4) in the case of a network slice supporting a roaming service, the network slice may encompass the Visited Public Land Mobile Network (VPLMN) part and the Home Public Land Mobile Network (HPLMN) part of the network slice.

According to aspects, a particular network slice may be identified by Single Network Slice Selection Assistance information (S-NSSAI). The S-NSSAI may comprise information regarding a Slice/Service type (SST), which indicates the expected behavior of the particular network slice in terms of features and services, and a Slice Differentiator (SD), which complements the SST to allow further differentiation for selecting a network slice instance from the potentially multiple network slice instances that all comply with the indicated SST. According to aspects, S-NSSAI may have standard values or PLMN-specific values.

According to aspects, when requesting access to a particular network slice, a UE may transmit network slice selection assistance information (NSSAI) to its serving access node. According to aspects, an NSSAI is a collection of S-NSSAIs, each of which assists the network in selecting a particular network slice instance. According to aspects, the core network (CN) part of a network slice instance(s) serving a UE may be selected by the CN, not by the Radio Access Network (RAN). According to aspects, when connectivity to a network slice is established, the CN informs the RAN by providing the S-NSSAI in order to enable the RAN to perform access specific functions (e.g. radio resource allocation).

According to aspects, network slice parameters may additionally include one or more configured S-NSSAIs, which indicate the S-NSSAIs configured in the UE by the HPLMN and which the UE may use in a serving PLMN (e.g., at initial registration) before the serving PLMN can assign one or more PLMN-specific Accepted S-NSSAIs.

Additionally, network slice parameters may include an accepted NSSAI, which may include one or more Accepted S-NSSAIs. For example, when the UE provides a requested S-NSSAI to the network, the network returns an Accepted S-NSSAI for each requested S-NSSAI by the network. According to aspects, the accepted S-NSSAI may have the same value as the requested S-NSSAI or may be a PLMN specific value for the serving PLMN. Further, according to aspects, the UE, after receiving an Accepted S-NSSAI, may not use in the same PLMN the configured S-NSSAI value for the corresponding slice. Additionally, the accepted NSSAI may not contain a value for all the requested S-NSSAIs, and may instead include only one or more Accepted S-NSSAIs only for the requested S-NSSAIs that are accepted in the current registration area.

Additionally, as indicated above, network slice parameters may include a requested NSSAI, which includes the S-NSSAIs that the UE provides to the network when requesting to be registered for a set of slices. According to aspects, the requested NSSAI may contain the S-NSSAIs corresponding to the slices the UE wishes to connect to/communicate over. According to aspects, the requested NSSAI may include the configured NSSAI (e.g., when the UE has no accepted NSSAI from the current PLMN), the accepted NSSAI, a sub-set of either the configured NSSAI or the accepted NSSAI, or a combination of S-NSSAIs belonging to the configured NSSAI or the accepted NSSAI. According to aspects the combination of S-NSSAIs may include an S-NSSAI in the accepted NSSAI for the UE's PLMN (e.g., if one is stored in the UE) or an S-NSSAI in the configured NSSAI applicable to the UE's PLMN (e.g., if the S-NSSAI was not previously rejected by the network for the present tracking area, or was not previously added by the UE in a requested NSSAI).

According to certain aspects, the UE may not provide in the requested NSSAI an S-NSSAI from the configured NSSAI that the UE previously provided to the serving PLMN in the current registration area. Further, according to aspects, if the UE has been provided a configured or accepted NSSAI for a selected PLMN, the UE may include a requested NSSAI created as described above in radio resource control (RRC) connection establishment and in non-access stratum (NAS). In some cases, the UE may use S-NSSAIs from the configured NSSAI in a PLMN if it has not been provided a corresponding Accepted S-NSSAI by the PLMN.

According to certain aspects, when a UE registers with a PLMN, the UE may provide to the network (e.g., its serving access network (AN)) in RRC and NAS layers a requested NSSAI containing the S-NSSAIs corresponding to the slices the UE wishes to connect to or communicate over, for example, in a registration request message. The AN may use the requested NSSAI provided in RRC signaling to select an access and mobility management function (AMF) capable of serving the requested network slices. The AMF is a network function that can be structurally implemented in dedicated hardware, instructions executed using dedicated hardware, or instructions executed on an appropriate platform, such as cloud infrastructure as discussed, for example, in 3GPP TR 23.799, Study on Architecture for Next Generation System, V.1.2.1, November 2016. According to aspects, the selected AMF may use the requested NSSAI provided in NAS signaling to validate the requested NSSAI based on the UE's subscription profile and local policy, and to create the accepted NSSAI to send back to the UE.

However, this registration procedure may lead to UE privacy leakage due to a UE providing slice information (e.g., S-NSSAIs) in unprotected signaling. For example, when transmitting the registration request message, the UE may include an NSSAI in the registration request message (and other registration management or mobility management procedures) indicating the slices (e.g., S-NSSAIs configured by the HPLMN) it requests to be registered with.

According to aspects, however, since the registration request message is a non-encrypted (e.g., plain-text) message, an eavesdropper may be able to identify the slices that a UE is attempting to access based on the NSSAI provided in the registration request message. Additionally, the NSSAI may leak the user or UE identity. This eavesdropping issue is especially problematic since some UEs may have access to critical network slices (e.g., for public safety) that are only authorized to government officials and other UEs, such as an IoT device (e.g., a sensor) and access a network slice for gathering sensitive measurement information. For example, if public safety UEs provide unprotected information about registering to public safety slices, even though the identity of the public safety user may not be revealed, an attacker can track public safety users.

Additionally, this issue in some cases cannot be simply solved by ciphering the NSSAI as it is sent before the UE establishes a security association with the network. For example, the NSSAI may be sent in RRC signaling for 3GPP access and connection establishment signaling (e.g., IKEv2 to establish an IPSec tunnel) in non-3GPP accesses, and the NSSAI may be used by the access network to select the AMF with which the UE establish a security association (e.g., a secure connection).

Thus, aspects of the present disclosure propose techniques for providing privacy during network access in a 5G network. For example, in some cases, this may involve establishing a secure connection with a serving network and then providing the NSSAI requiring privacy in a secure message. In other case, maintaining privacy during network access may involve using a pre-shared protection key between a UE and a serving network to scramble the NSSAI before the NSSAI is transmitted to the network. In other cases, maintaining privacy during network access may involve the use of a globally unique temporary identifier provided to the UE (after registering with a network) that includes information related to previously-accessed network slices.

As noted above, one way to maintain privacy of a UE accessing a network may involve the UE establishing a secure connection with a serving network and then providing S-NSSAIs requiring privacy in a secure message. For example, a UE may be provisioned with a configured NSSAI by its HPLMN and each S-NSSAI in the configured NSSAI may be associated with its own privacy flag. According to aspects, for each S-NSSAI, the associated privacy flag may be configured at a UE. For example, if a particular network slice requires privacy, then the UE may be configured with the privacy flag associated with the slice's S-NSSAI set to '1', whereas if the slice does not require privacy, the UE may be configured with the privacy flag associated with the slice's S-NSSAI set to '0' (i.e., '1' means "privacy required", '0' means "privacy not required" in this example).

According to aspects, when the UE registers to a network, the UE may provide to the serving network a requested NSSAI (e.g., in a registration request message) that only contains the S-NSSAIs for which the privacy flag is not set (i.e., for S-NSSAIs that do not require privacy, the privacy flag is set to '0'). That is, the UE may not include S-NSSAIs that require privacy in the requested NSSAI in the registration request message (e.g., S-NSSAIs where the privacy flag is set to '1').

According to certain aspects, an AN may receive an RRC request containing the registration request message and the requested NSSAI (if any) and performs AMF selection based on the requested NSSAI. In some cases, only providing the S-NSSAIs for which privacy is not required in the registration request messages may lead to the AN selecting an AMF that can support the slices indicated by the requested S-NSSAIs, but which may be suboptimal or not suitable to support the full set of slices the UE needs to be registered for (e.g., including S-NSSAIs whose privacy flags are set). This issue is addressed in greater detail below.

Once the UE has transmitted the registration request message, it may receive a confirmation message, indicating that a secure connection (e.g., a secure NAS connection) with the serving network has been established. Then, according to aspects, if the UE needs to use the network slices whose S-NSSAI privacy flag is set, the UE may transmit another requested NSSAI containing the full set of S-NSSAIs it needs to be registered to (including those for which the privacy flag is set) in a secure message, for example, using a secure NAS message (e.g., a NAS secure mode complete or an attach request message). The AMF may receive the secure message, including the full set of S-NSSAIs, and transmit a confirmation that the UE is permitted to communicate over the slices indicated in the secure message, i.e., a confirmation containing an accepted NSSAI. In some cases, based on the requested NSSAI included in the secure message, the AMF may need to perform AMF relocation to select a more appropriate AMF to serve the complete requested NSSAI.

Additionally, in some cases, the accepted NSSAI may comprise updated privacy flag information for the S-NSSAIs in the requested NSSAI. The UE may receive the updated privacy flag information and may decide whether or not to update the privacy flags of the corresponding S-NSSAIs. In some cases, the UE may decide to override the updated privacy flag information (e.g., possibly in a situation where the AMF updates an S-NSSAI from private to public, but the UE wants the S-NSSAI to remain private).

Figure 8:
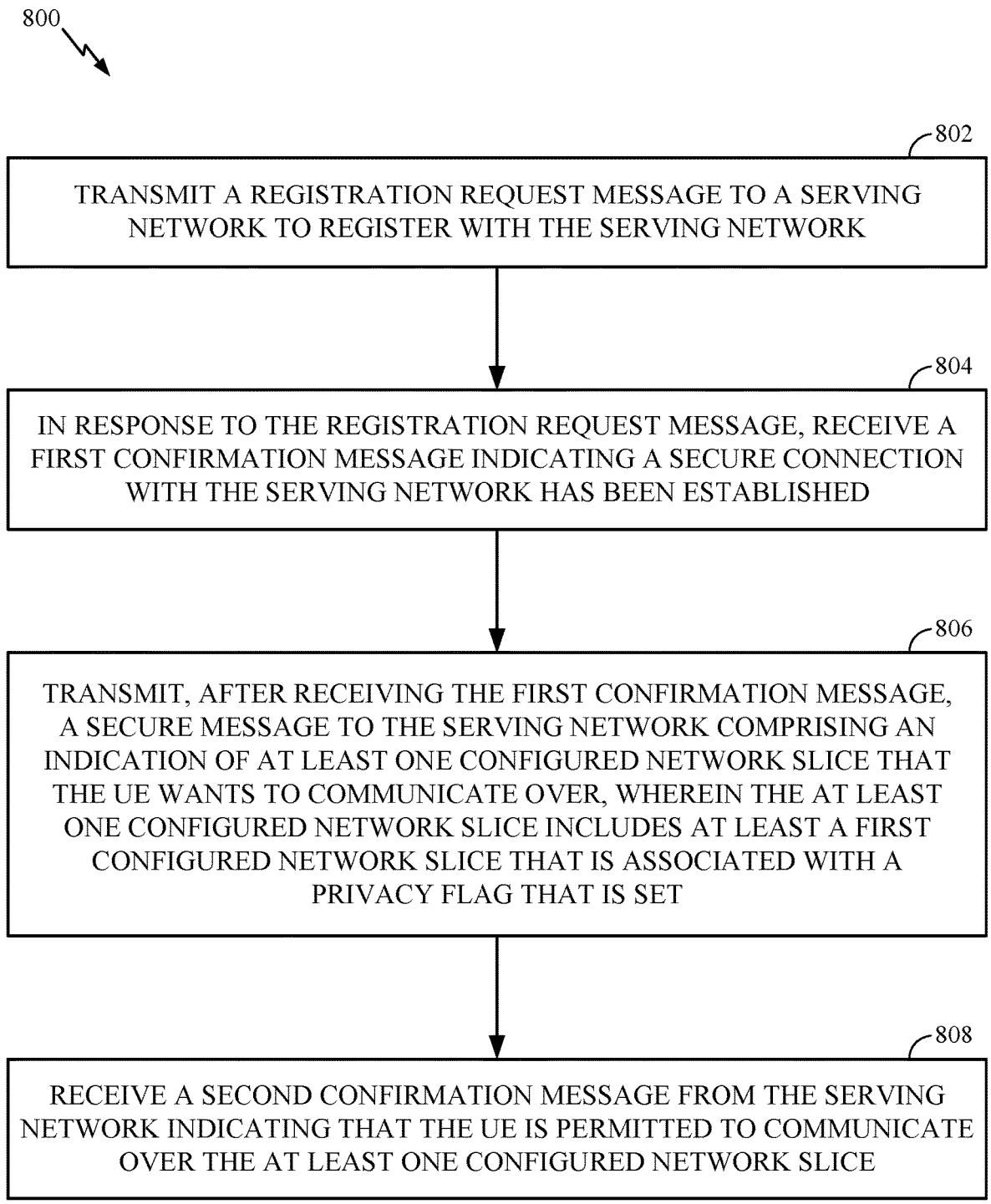
FIG. 8 is a flow diagram illustrating example operations for wireless communications in a network, in accordance with certain aspects of the present disclosure.

FIG. 8 illustrates example operations 800 for wireless communications. According to certain aspects, operations 800 may be performed, for example, by a user equipment (UE) for maintaining privacy of the UE when accessing a network, for example, by using a secure message to request access to network slices requiring privacy (e.g., having an associated privacy flag that is set).

Operations 800 begin at 802 by transmitting a registration request message to a serving network to register with the serving network. At 804, in response to the registration request message, the UE receives a first confirmation message indicating a secure connection with the serving network has been established. At 806, the UE transmits, after receiving the first confirmation message, a secure message to the serving network comprising an indication of at least one configured network slice that the UE wants to communicate over, wherein the at least one configured network slice is associated with a privacy flag that is set. At 808, the UE receives a second confirmation message from the serving network indicating that the UE is permitted to communicate over the at least one configured network slice.

Figure 9:
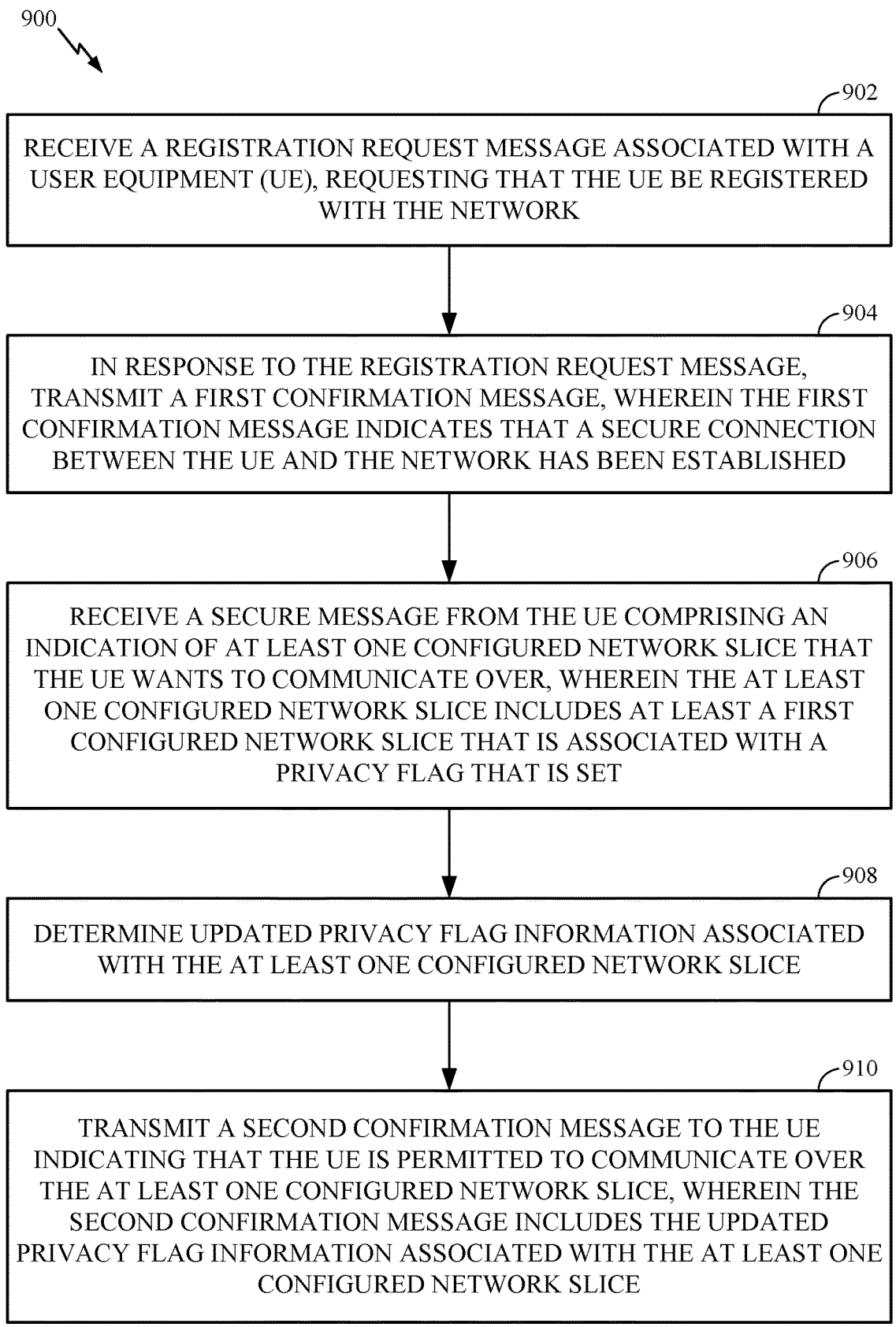
FIG. 9 is a flow diagram illustrating example operations for wireless communications in a network, in accordance with certain aspects of the present disclosure.

FIG. 9 illustrates example operations 900 for wireless communication in a network. According to certain aspects, operations 900 may be performed, for example, by an access and mobility management function (AMF) for maintaining privacy of a UE accessing a network, for example, by receiving a secure message from the UE requesting access to network slices requiring privacy (e.g., having an associated privacy flag that is set). According to aspects, operations 900 may be complementary to operations 800.

Operations 900 begin at 902 receiving a registration request message associated with a user equipment (UE), requesting that the UE be registered with the network. At 904, in response to the registration request message, the AMF transmits a first confirmation message, wherein the first confirmation message indicates that a secure connection between the UE and the network has been established. At 906, the AMF receives a secure message from the UE comprising an indication of at least one configured network slice that the UE wants to communicate over, wherein the at least one configured network slice is associated with a privacy flag that is set. At 908, the AMF determines updated privacy flag information associated with the at least one configured network slice. At 910, the AMF transmits a second confirmation message to the UE indicating that the UE is permitted to communicate over the at least one configured network slice, wherein the second confirmation message includes the updated privacy flag information associated with the at least one configured network slice.

Figure 10:
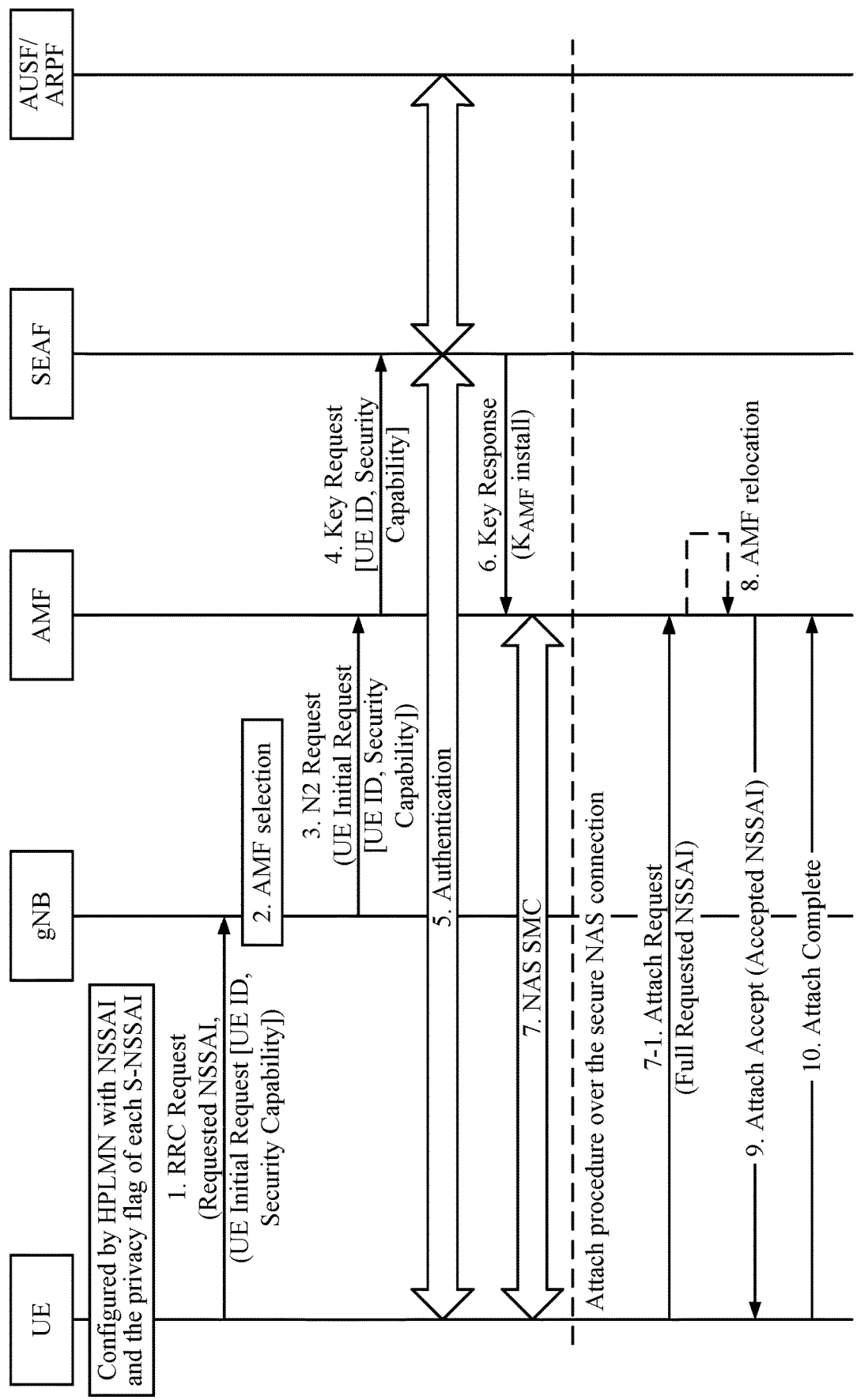
FIG. 10 is a call-flow diagram illustrating an example registration procedure, in accordance with certain aspects of the present disclosure.

FIG. 10 is a call flow diagram illustrating a registration procedure with NSSAI privacy. For example, as illustrated, a user equipment (UE) may receive an indication of one or more configured network slices (e.g., S-NSSAIs), configured by the UE's Home Public Land Mobile Network (HPLMN) (e.g., home network). According to aspects, each configured network slice (e.g., S-NSSAI) may be associated with a privacy flag, for example, that is either set (e.g., for configured network slices requiring privacy) or not set (e.g., for configured network slices not requiring privacy).

At a certain point, the UE may wish to access the network, which may begin with establishing a secure NAS connection based on authentication with the authentication server function (AUSF). For example, as illustrated at step 1, the UE may transmit an initial registration request message that includes an identifier of the UE (e.g., UE ID), a security capability of the UE, and an NSSAI for any public network slices (e.g., NSSAI(pub)) that the UE wants to communicate over. As noted above, a public NSSAI consists of the S-NSSAIs whose privacy flags are not set. In some cases, the UE may exclude the NSSAI from the initial registration message, in which case the initial registration message may only include the UE ID and the UE's security capability.

At step 2, based on the initial registration message, a gNB may perform AMF selection, and may forward the initial registration message to the selected AMF at step 3. In some cases, if the UE did not provide a requested NSSAI in the initial registration request message, the gNB may select a default AMF, otherwise, the gNB may select an appropriate AMF to serve the network slices (e.g., S-NSSAIs) indicated in the NSSAI in the RRC request containing the initial registration message.

At step 4, the AMF may transmit a key request (including the UE ID and security capability of the UE) to a security anchor function (SEAF) (e.g., which maintains the anchor key established in the network for the UE, and derives keys and provides those keys to other network functions (e.g., AMF) to help them establish a security association with the UE). The SEAF may then communicate with the authorization server function (AUSF) to authenticate the UE at step 5. At step 6, the SEAF may generate a key response and transmit it to the AMF. Based on the key response, the AMF may transmit a confirmation message to the UE, indicating that a secure connection has been established between the UE and the network at step 7. According to aspects, the confirmation message may include an accepted NSSAI for the NSSAI included in the initial registration message. Additionally, the accepted NSSAI may comprise updated privacy flag information for the accepted S-NSSAIs in the accepted NSSAI, which the UE may use to update the privacy flags associated with the S-NSSAIs or not.

The UE may then perform an attach procedure with the network. For example, at step 7-1, the UE may transmit an attach request to the selected AMF. According to aspects, the UE may include an additional requested NSSAI in the attach request, which may comprise a full set of S-NSSAIs for which the UE wants to communicate over, including both S-NSSAIs whose privacy flags are set (e.g., S-NSSAIs requiring privacy) and S-NSSAIs whose privacy flags are not set (e.g., S-NSSAIs not requiring privacy). According to aspects, since the attach request is a secure message (e.g., a NAS secure message), as opposed to the initial registration message (e.g., which may be a non-encrypted, plain-text message), the NSSAI in the attach request may not be interpreted by eavesdroppers. In some cases, based on the requested NSSAI in the attach message, the AMF may perform, at step 8, AMF relocation and select a more appropriate AMF to serve all of the S-NSSAIs in the requested NSSAI.

According to aspects, at step 9, the AMF may transmit an attach accept message (including an accepted NSSAI indication) to the UE, confirming the UE is permitted to communicate over the network slices corresponding to the S-NSSAIs included in the requested NSSAI. According to aspects, as noted above, the accepted NSSAI indication may comprise updated flag information for the S-NSSAIs included in the NSSAI. While not illustrated in FIG. 10, the UE may store the updated flag information and determine whether or not to update the privacy flags of the S-NSSAIs in the accepted NSSAI based on the stored updated flag information. For example, in some cases, the updated flag information may indicate that a private S-NSSAI has switched to a public S-NSSAI. However, in such a case, the UE may still want this S-NSSAI to remain private and may decide to override the updated privacy flag information for this S-NSSAI.

At step 10, the UE may transmit an attach complete message to the AMF and may begin communication over the configured network slices.

As noted above, another way to maintain privacy of a UE accessing a network may involve the UE using a pre-shared protection key to scramble S-NSSAIs contained in the NSSAI before the NSSAI is transmitted to the network. For example, according to aspects, a UE's HPLMN may provision an NSSAI protection key ($K_{NSSAI}$) for NSSAI privacy at a VPLMN based on the service level agreement (SLA). According to aspects, the $K_{NSSAI}$ may be a PLMN specific key (i.e., each PLMN may be associated with a different provisioned $K_{NSSAI}$ protection key). Additionally, each PLMN may be assigned with multiple $K_{NSSAI}$s. Additionally, according to aspects, each $K_{NSSAI}$ may be associated with a different key ID, providing an indication of the $K_{NSSAI}$ that the key ID is associated with. In some cases, different UEs that have subscription to the same HPLMN may be assigned with different $K_{NSSAI}$s.

According to aspects, when the UE wants to connect to a private network slice (i.e., where the privacy flag associated with the S-NSSAI of this slice is set to an appropriate value), the UE may generate a protected S-NSSAI (i.e., the keyed hash value of the S-NSSAI) for this network slice and provide it in the initial registration request message, for example, by scrambling the S-NSSAI of the network slice using the protection key associated with the VPLMN (e.g., the VPLMN's $K_{NSSAI}$). For example, the protected S-NSSAI may comprise a key ID for $K_{NSSAI}$ for the VPLMN (that the UE is wanting to connect to) and a keyed hash value of the S-NSSAI. That is, the protected S-NSSAI=Key ID|F($K_{NSSAI}$, S-NSSAI) where F is a keyed hash function, such as HMAC-SHA-256, HMAC-SHA-384, HMAC-SHA-512, HMAC-SHA-3, etc. According to aspects, the output of F may be truncated to L bits (e.g., L most significant bits (MSBs)).

According to aspects, even if a UE knows $K_{NSSAI}$, if the UE is not authorized to access a specific slice and hence is not configured with the corresponding S-NSSAI by HPLMN, the UE cannot identify the slice from the protected S-NSSAI. Additionally, according to aspects, if every single S-NSSAI is protected, the NSSAI privacy can be further enhanced. Otherwise, one may be able at least tell whether other UEs are accessing a private slice or not based on the requested S-NSSAI presented by them.

According to certain aspects, the UE may include the protected S-NSSAIs in the registration message and may transmit this message to the AN. According to aspects, the AN may be configured on a per-in-bound-PLMN basis with the protected S-NSSAIs via an Operations, Administration and Maintenance (OAM) server. That is, the AN may be configured with the protected S-NSSAI and the corresponding S-NSSAI pair via the OAM server.

According to certain aspects, once the AN receives the registration message, including the protected S-NSSAIs, the AN may determine the identities of the protected S-NSSAIs, for example, based on a key ID and the keyed hash value associated with the protected S-NSSAIs. For example, when the AN receives an registration request message (e.g., RRC connection request) carrying NSSAI containing protected S-NSSAIs from the UE, the AN may obtain the PLMN ID (i.e., Mobile Country Code (MCC)|Mobile Network Code (MNC)) from the UE permanent identity (e.g., IMSI or private IMSI or PMSI), check the protected S-NSSAIs, and identify the actual S-NSSAIs the UE is requesting. After determining the actual S-NSSAIs that the UE is requesting, the AN may select an AMF that is capable of serving the requested S-NSSAIs.

Figure 11:
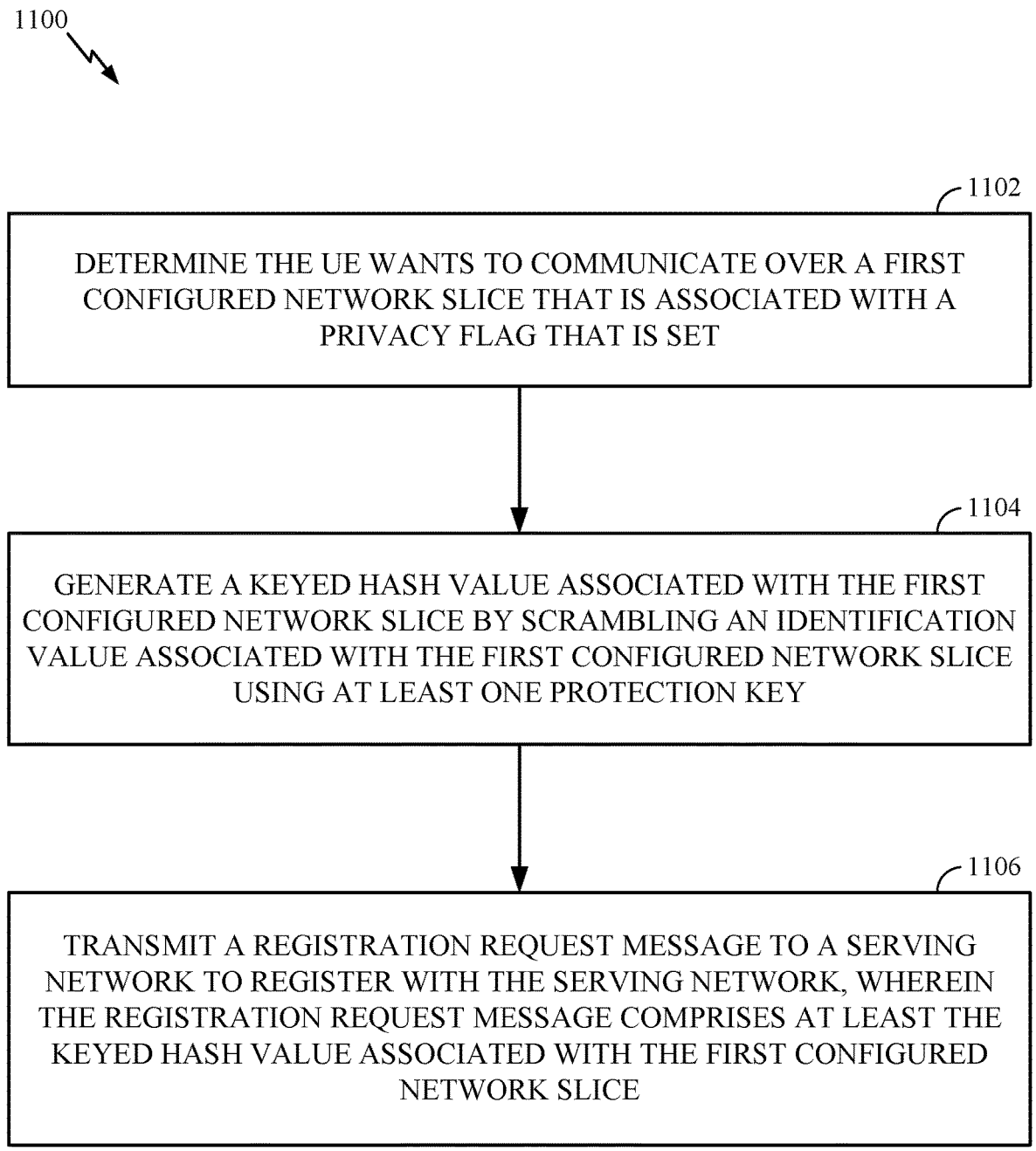
FIG. 11 is a flow diagram illustrating example operations for wireless communications in a network, in accordance with certain aspects of the present disclosure.

FIG. 11 illustrates example operations 1100 for wireless communications. According to certain aspects, operations 1100 may be performed, for example, by a user equipment for maintaining privacy of the UE when accessing a network, for example, by using a pre-shared protection key to scramble S-NSSAIs contained in the NSSAI before the NSSAI is transmitted to the network as described above.

Operations 1100 begin at 1102 by determining the UE wants to communicate over a first configured network slice that is associated with a privacy flag that is set. At 1104, the UE generates a keyed hash value associated with the first configured network slice by scrambling an identification value associated with the first configured network slice using at least one protection key. At 1106, the UE transmits a registration request message to a serving network to register with the serving network, wherein the registration request message comprises at least the keyed hash value associated with the first configured network slice.

Figure 12:
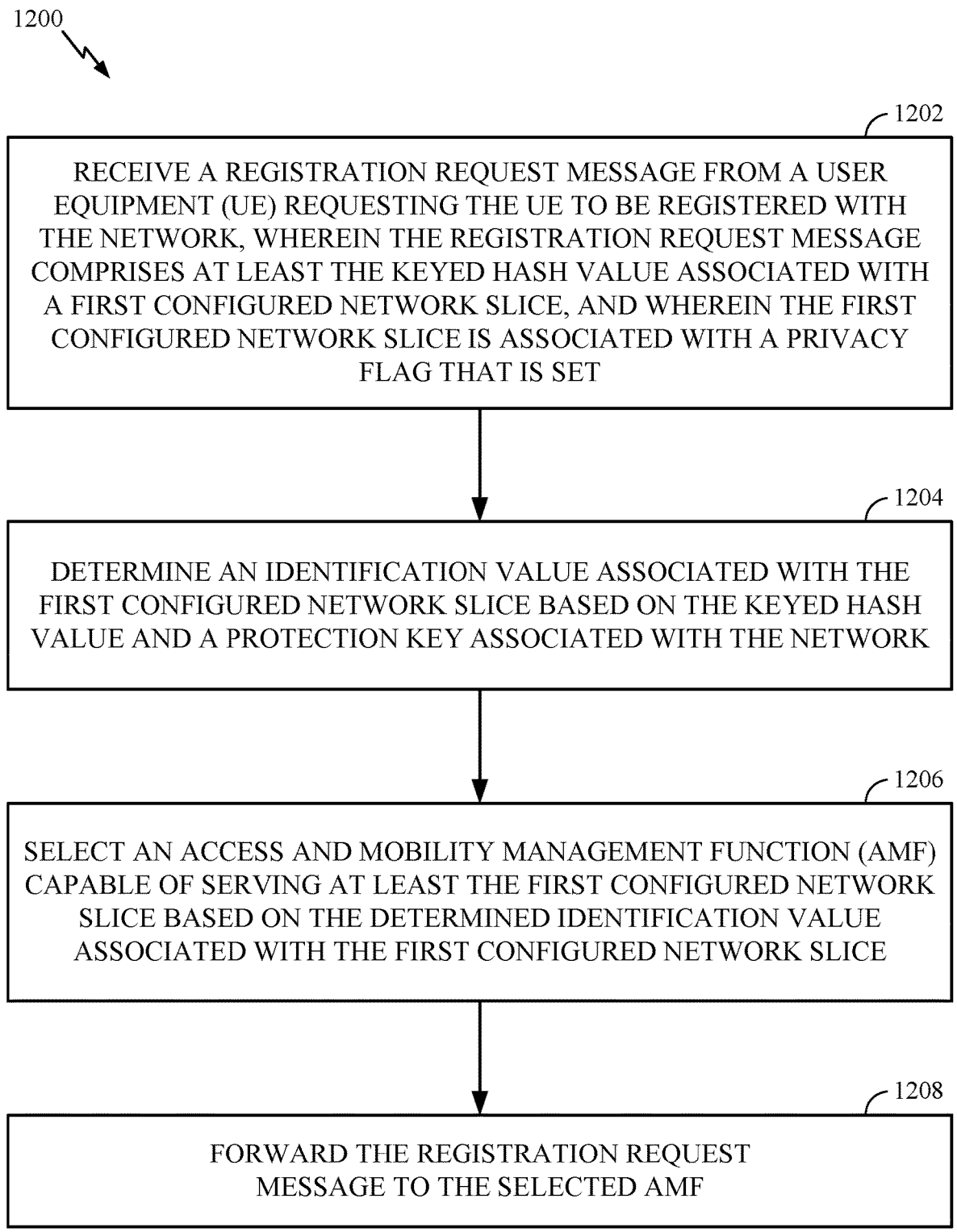
FIG. 12 is a flow diagram illustrating example operations for wireless communications in a network, in accordance with certain aspects of the present disclosure.

FIG. 12 illustrates example operations 1200 for wireless communications. According to certain aspects, operations 1200 may be performed, for example, by an access node (e.g., access node 206 in FIG. 2) for maintaining privacy of a UE accessing a network. According to aspects, operations 1200 may be complementary to operations 1100 in FIG. 11.

Operations 1200 begin at 1202 by receiving a registration request message from a user equipment (UE) requesting the UE to be registered with the network, wherein the registration request message comprises at least the keyed hash value associated with a first configured network slice, and wherein the first configured network slice is associated with a privacy flag that is set. At 1204, the AN determines an identification value associated with the first configured network slice based on the keyed hash value and a protection key associated with the network. At 1206, the AN selects an access and mobility management function (AMF) capable of serving at least the first configured network slice based on the determined identification value associated with first configured network slice. At 1208, the AN forwards the registration request message to the selected AMF.

Figure 13:
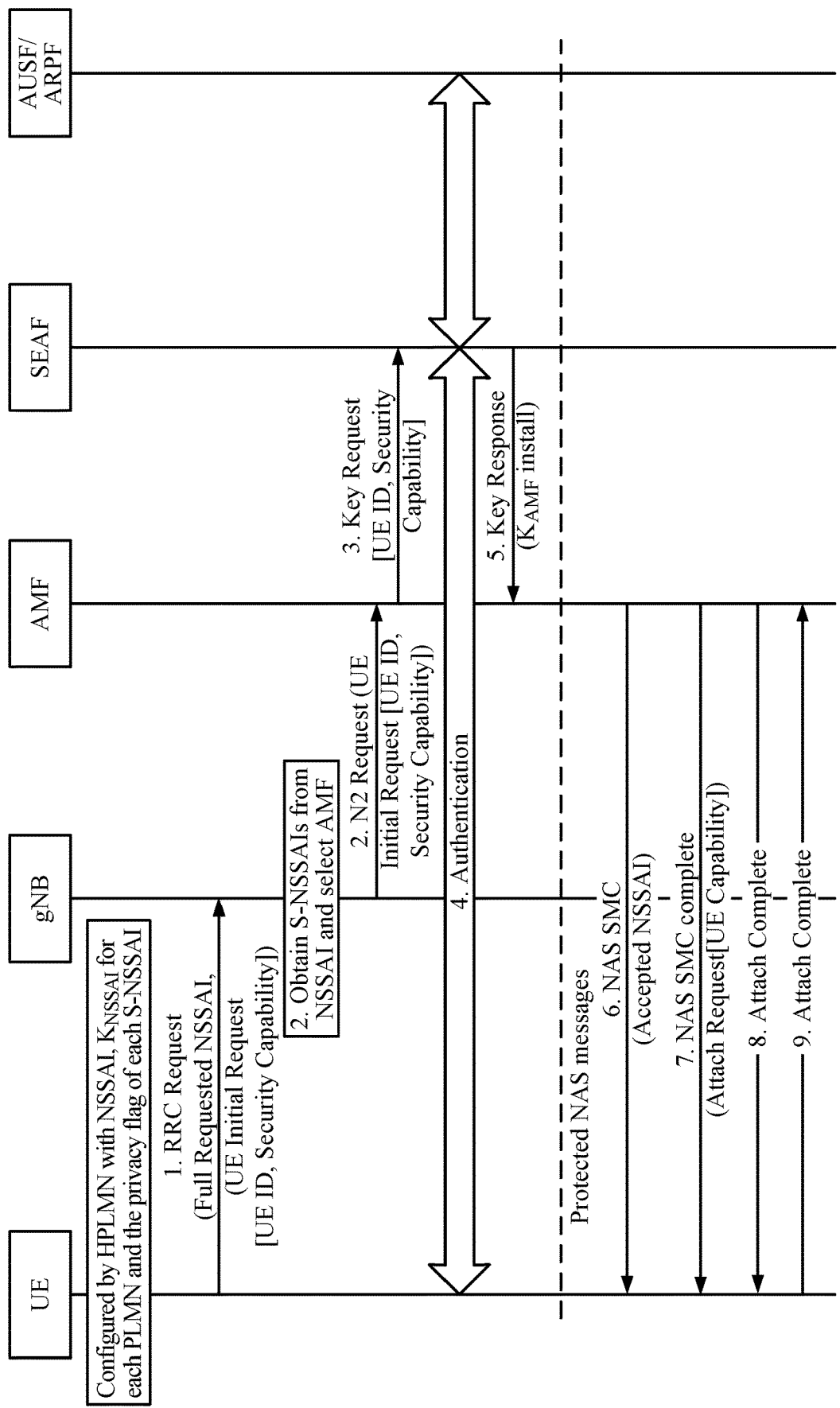
FIG. 13 is a call-flow diagram illustrating an example registration procedure, in accordance with certain aspects of the present disclosure.

FIG. 13 is a call flow diagram illustrating a registration procedure using protected S-NSSAIs (e.g., protected using a pre-shared protection key). For example, as illustrated, the UE may be configured by HPLMN with NSSAI, $K_{NSSAI}$ for each PLMN and the privacy flag of each S-NSSAI. According to aspects, the HPLMN may configure a single $K_{NSSAI}$ based on which per-PLMN key is derived. For example, $K_{NSSAI,PLMN}$=KDF($K_{NSSAI}$, PLMN ID), where KDF is a key derivation function constructed based on a keyed hash function such as a HMAC-SHA-256, HMAC-SHA-384, HMAC-SHA-512, HMAC-SHA-3, etc.

According to aspects, the AN may be configured by an OAM server with (protected S-NSSAI, S-NSSAI) pairs for each PLMN. In some cases, the AN may query a DB maintaining (protected S-NSSAI, S-NSSAI) pairs when it sees a new protected S-NSSAI.

According to aspects, as illustrated at step 1, the UE may send a registration request to the serving network containing the full requested NSSAI. According to aspects, for S-NSSAIs with privacy flag set, the UE computes the protected S-NSSAIs using $K_{NSSAI}$ (as described above) and includes them in the NSSAI. At step 2, the AN obtains S-NSSAIs from the NSSAI (e.g., by using a Key ID and mapping between the protected S-NSSAIs and the S-NSSAIs obtained from an OAM server or a DB) and selects an AMF capable of serving the S-NSSAIs. For example, if an S-NSSAI is protected, in some cases, the AN may obtain the S-NSSAI by looking up the table containing (protected S-NSSAI, S-NSSAI) pairs configured by an OAM server. According to aspects, once the AN selects the AMF, the registration procedure proceeds as normal (e.g., as described above with respect to FIG. 10, except the UE does not provide the NSSAI in the attach request).

Figure 14:
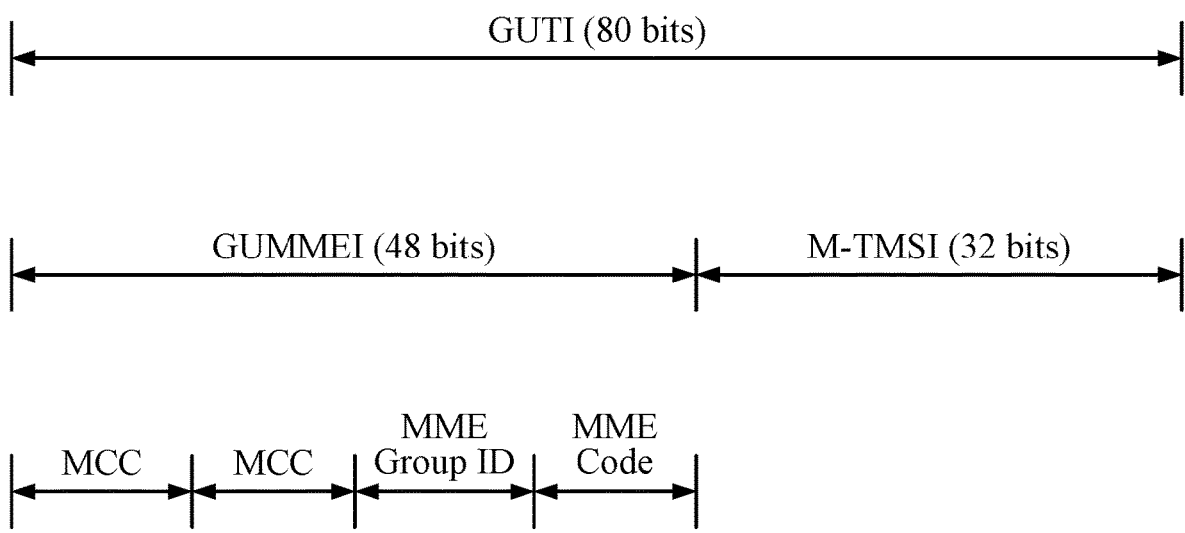
FIG. 14 illustrates the makeup of an example globally unique temporary identifier, in accordance with certain aspects of the present disclosure.

According to aspects, another way to maintain privacy during network access may involve the use of a globally unique temporary identifier provided to the UE (after registering with a network) that includes information related to the AMF that allocated the temporary identifier. For example, assume that the UE is attached to the network with access to a set of slices (i.e., identified by the accepted NSSAI). The UE may then be allocated with a temporary identifier from the AMF, where the temporary identifier may represent a globally unique temporary identifier (GUTI). For example, as illustrated in FIG. 14, in LTE, GUTI=GUMMEI+S-TMSI, where GUMMEI indicates an MME that should serve the UE. Similarly, in 5G, 5G GUTI may include the globally unique AMF identifier (i.e., GUMMEI equivalent of 5G GUTI) that should serve the slices for which the UE wants to communicate over. According to aspects, for illustration purposes, the globally unique AMF identifier is referred to GUMMEI.

According to aspects, when the UE wants to access a set of slices that it accessed before, the UE may provide the GUMMEI part of the GUTI (e.g., that the UE stored locally in its previous registration) in the registration request. Then, the AN, if it has a connection (i.e., N2 interface or equivalent to S1-MME in LTE) to the AMF identified by the GUMMEI, selects the AMF identified by the GUMMEI. Otherwise, the RAN may select an equivalent AMF to the one identified with the GUMMEI.

According to aspects, to select the equivalent AMF, the RAN may need to know the information regarding the slices supporting information of all AMFs in the network (even for those it doesn't have an interface). According to aspects, this information (i.e., the information regarding the slices supporting information of all AMFs in the network) may be locally provisioned by the PLMN via the OAM server, or can be retrieved from the OAM server. According to aspects, though this GUMMEI cannot precisely identify the S-NS-SAIs that the UE wants to be registered with (e.g., it may not exactly indicate the set of slices the UE wants to access), the GUMMEI can help the RAN to select an appropriate AMF based on the slice supporting information of each AMF.

According to aspects, the GUMMEI is globally unique, so when a UE stores the (GUMMEI, accepted NSSAI) pair, it may be stored per network even if the set of slices are the same. Also, for a single network, the UE may store multiple pairs of (GUMMEI, accepted NSSAI) pairs if it has accessed different set of slices at different times.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for receiving, means for determining, means for performing, means for communicating, means for storing, means for entering, means for exiting, means for generating, means for forwarding, and/or means for providing may comprise one or more processors or antennas at the BS 110 or UE 120, such as the transmit processor 220, controller/processor 240, receive processor 238, or antennas 234 at the BS 110 and/or the transmit processor 264, controller/processor 280, receive processor 258, or antennas 252 at the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software (e.g., executable instructions), the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user equipment (UE) and/or base station (BS) as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user equipment and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A user equipment (UE) configured for wireless communications, the UE comprising:
one or more memories comprising executable instructions;
one or more processors in data communication with the one or more memories and configured to, individually or collectively, execute the executable instructions and cause the UE to
transmit a registration request message to a serving network to register with the serving network;
receive a first confirmation message indicating a secure connection with the serving network has been established;
transmit, after receiving the first confirmation message, a secure message to the serving network comprising an indication of at least one configured network slice that the UE wants to communicate over, wherein the at least one configured network slice is associated with a privacy indication that is set to a value on the UE indicating that the at least one configured network slice cannot be requested prior to a secure connection being established with the serving network, and wherein the transmitting the secure message after receiving the first confirmation message is based on the privacy indication being set to the value; and
receive a second confirmation message from the serving network indicating that the UE is permitted to communicate over the at least one configured network slice.

2. The UE of claim 1, wherein the one or more processors are further configured to execute the executable instructions and cause the UE to:
receive, from a home network via a message, an indication of one or more network slices that are configured for communication in the serving network,
wherein each respective network slice of the one or more network slices that are configured for communication in the serving network is associated with respective a privacy indication.

3. The UE of claim 1, wherein:
the registration request message comprises an indication of at least a second configured network slice that the UE wants to communicate over, and
the second configured network slice is associated with a privacy indication that is not set.

4. The UE of claim 1, wherein the secure message comprises an indication of all configured network slices that the UE wants to communicate over irrespective of whether privacy indications associated with the configured network slices the UE wants to communicate over are set or not.

5. The UE of claim 1, wherein the second confirmation message comprises at least one indication of a configured network slice that the UE is permitted to communicate over.

6. The UE of claim 5, wherein the at least one indication of the configured network slice that the UE is permitted to communicate over includes updated privacy indication information for the configured network slice that the UE is permitted to communicate over.

7. The UE of claim 1, wherein the one or more processors are further configured to execute the executable instructions and cause the UE to:
generate a keyed hash value associated with the at least one configured network slice by scrambling an identification value associated with the at least one configured network slice using at least one protection key,
wherein the registration request message comprises the keyed hash value associated with the at least one configured network slice.

8. The UE of claim 7, wherein the registration request message further comprises at least one key identifier associated with the at least one protection key.

9. The UE of claim 7, wherein the keyed hash value comprises a number of most significant bits (MSB) associated with the scrambling of the identification value associated with the at least one configured network slice using the at least one protection key.

10. A method of wireless communications by a user equipment (UE), the method comprising:
transmitting a registration request message to a serving network to register with the serving network;
receiving a first confirmation message indicating a secure connection with the serving network has been established;
transmitting, after receiving the first confirmation message, a secure message to the serving network comprising an indication of at least one configured network slice that the UE wants to communicate over, wherein the at least one configured network slice is associated with a privacy indication that is set to a value on the UE indicating that the at least one configured network slice cannot be requested prior to a secure connection being established with the serving network, and wherein the transmitting the secure message after receiving the first confirmation message is based on the privacy indication being set to the value; and
receiving a second confirmation message from the serving network indicating that the UE is permitted to communicate over the at least one configured network slice.

11. The method of claim 10, further comprising:
receiving, from a home network via a message, an indication of one or more network slices that are configured for communication in the serving network,
wherein each respective network slice of the one or more network slices that are configured for communication in the serving network is associated with a respective privacy indication.

12. The method of claim 10, wherein:
the registration request message comprises an indication of at least a second configured network slice that the UE wants to communicate over, and
the second configured network slice is associated with a privacy indication that is not set.

13. The method of claim 10, wherein the secure message comprises an indication of all configured network slices that the UE wants to communicate over irrespective of whether privacy indications associated with the configured network slices that the UE wants to communicate over are set or not.

14. The method of claim 10, wherein the second confirmation message comprises at least one indication of a configured network slice that the UE is permitted to communicate over.

15. The method of claim 14, wherein the at least one indication of the configured network slice that the UE is permitted to communicate over includes updated privacy indication information for the configured network slice that the UE is permitted to communicate over.

16. The method of claim 10, further comprising:
generating a keyed hash value associated with the at least one configured network slice by scrambling an identification value associated with the at least one configured network slice using at least one protection key,
wherein the registration request message comprises the keyed hash value associated with the at least one configured network slice.

17. The method of claim 16, wherein the registration request message further comprises at least one key identifier associated with the at least one protection key.

18. The method of claim 16, wherein the keyed hash value comprises a number of most significant bits (MSB) associated with the scrambling of the identification value associated with the at least one configured network slice using the at least one protection key.

19. A non-transitory computer-readable medium comprising executable instructions that, when executed by a processor in a user equipment (UE), cause the UE to perform a method of wireless communications, the method comprising:
transmitting a registration request message to a serving network to register with the serving network;
receiving a first confirmation message indicating a secure connection with the serving network has been established;
transmitting, after receiving the first confirmation message, a secure message to the serving network comprising an indication of at least one configured network slice that the UE wants to communicate over, wherein the at least one configured network slice is associated with a privacy indication that is set to a value on the UE indicating that the at least one configured network slice cannot be requested prior to a secure connection being established with the serving network, and wherein the transmitting the secure message after receiving the first confirmation message is based on the privacy indication being set to the value; and
receiving a second confirmation message from the serving network indicating that the UE is permitted to communicate over the at least one configured network slice.

20. The non-transitory computer-readable medium of claim 19, wherein the method further comprises:
receiving, from a home network via a message, an indication of one or more network slices that are configured for communication in the serving network,
wherein each respective network slice of the one or more network slices that are configured for communication in the serving network is associated with a respective privacy indication.

* * * * *